United States Patent [19]
Fox

[11] 3,800,025
[45] Mar. 26, 1974

[54] RECOVERY OF TUNGSTEN FROM LOW GRADE TUNGSTEN ORES

[75] Inventor: Joseph S. Fox, Lewiston, N.Y.

[73] Assignee: Union Carbide Corporation, New York, N.Y.

[22] Filed: Mar. 30, 1972

[21] Appl. No.: 239,618

[52] U.S. Cl.................................... 423/61, 423/53
[51] Int. Cl.............................................. C01g 41/00
[58] Field of Search................................ 423/53, 61

[56] References Cited
UNITED STATES PATENTS
1,015,469  1/1912  Blecker................................ 423/65
2,501,952  3/1950  Maier................................... 423/53

FOREIGN PATENTS OR APPLICATIONS
122,051  1/1919  Great Britain........................ 423/53
227,521  1/1960  Australia.............................. 423/61
607,641  10/1960  Canada................................ 423/61

Primary Examiner—Herbert T. Carter
Attorney, Agent, or Firm—Frederick J. McCarthy, Jr.

[57] ABSTRACT

A method of extracting tungsten from ores containing low tungsten concentrations comprising the steps of roasting a particulated low grade tungsten-containing ore in the presence of the reagents $Na_2CO_3$ or $Na_3PO_4$ and NaCl, followed thereafter by water-leaching and filtering. About 85 percent of the tungsten reports in the filtrate whereupon it can be extracted by conventional techniques.

4 Claims, No Drawings

RECOVERY OF TUNGSTEN FROM LOW GRADE TUNGSTEN ORES

FIELD OF THE INVENTION

This invention is directed to a simplified and economical process for substantially recovering tungsten from a low grade ore containing less than about 5 percent tungsten trioxide.

BACKGROUND OF THE INVENTION

Tungsten trioxide ($WO_3$) is found in ore deposits in the United States and other countries in various concentrations. In addition, the various grades of deposits contain many other constituents such as calcium, iron, silica, manganese and the like. The economical extraction of tungsten from ore grades containing in excess of 5 percent $WO_3$ has been accomplished by the physical up-grading process which consists mainly in the steps of separating the scheelite from the ore by physical methods and then dissolving the tungsten with $Na_2CO_3$ under pressure in an autoclave.

The extraction of tungsten from low grade ore containing less than about 5 percent $WO_3$ has been a major problem to industry. One method successfully employed for the extraction of tungsten from low grade ore, however, has entailed the roasting of the ore with various amounts of calcium oxide (CaO) and calcium chloride ($CaCl_2$). The roasting is conducted at a temperature of about 900°C. for a period of about three hours whereupon the roasted ore is then pressure leached at an elevated temperature using sodium carbonate ($Na_2CO_3$). The filtering of the leach solution nominally yields an extraction of $WO_3$ of about 92 to 97 percent. Although this process is successful in extracting a percentage of the $WO_3$ from low grade ore, it is rather costly and time consuming to be carried out on a large scale basis for the recovery of tungsten.

U.S. Pat. No. 1,013,364 discloses a method for extracting tungsten from ore deposits whereby the ore is roasted in the presence of $Na_2CO_3$ at a temperature between 650°C. and 800°C. The calcines are then leached with water, or NaOH, or leached under pressure with a $Na_2CO_3$ solution. The use of $Na_2CO_3$ alone in the roast cycle has been found to inadequately produce tungsten solubilization to render the process suitable for commercial exploitation.

The present invention overcomes the above limitations and is directed primarily to a simplified process for economically recovering tungsten from a low grade tungsten ore containing less than about 5 percent tungsten trioxide.

SUMMARY OF THE INVENTION

The invention relates to a roast-water leach process whereby at least 70 percent of the tungsten can be extracted from a low grade tungsten ore. The ore is first pulverized to a particulated form whereupon it is then roasted in the presence of sodium chloride (NaCl) and at least one of the reagents selected from the group consisting of sodium carbonate ($Na_2CO_3$) and sodium phosphate ($Na_3PO_4$). The roast is heated in a water-containing atmosphere at a temperature and for a time period sufficient to solubilize the tungsten values in the ore according to one of the following reactions:

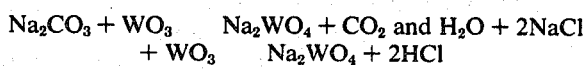

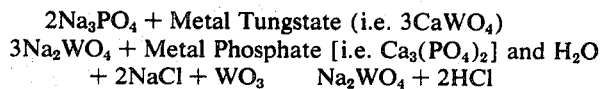

OR $2Na_3PO_4$ + Metal Tungstate (i.e. $3CaWO_4$)
$3Na_2WO_4$ + Metal Phosphate [i.e. $Ca_3(PO_4)_2$] and $H_2O$
+ $2NaCl$ + $WO_3$    $Na_2WO_4$ + $2HCl$ The burning of natural gas in the presence of air during the roasting step produces a water-containing atmosphere. If the wet atmosphere is less than desired, then an excessive amount of wet air could be passed over the ore mixture during the roasting step.

The roasted ore is then water-leached whereupon the soluble tungsten is substantially dissolved in the mixture. The tungsten-containing mixture is thereafter filtered by conventional means whereupon the tungsten reports in the filtrate where it can then be extracted by conventional techniques such as by solvent extraction and stripping.

The ore can be pulverized, ground or otherwise granulated to a size substantially between about 50 Tyler mesh and about 325 Tyler mesh with a size substantially between about 200 Tyler mesh and about 325 Tyler mesh being preferable. The particulated ore will thus be in a form suitable to facilitate the reaction of the tungsten values in the ore with $Na_2CO_3$ or $Na_3PO_4$, and NaCl to produce a soluble state of the tungsten according to the above reactions.

In the preferred embodiment, the ratio of the sodium carbonate or sodium phosphate reagent to sodium chloride which is to be added to the ore prior to roasting is variable but should be between about 1/1 and about 1/3 with the preferable ratio being about 1/1. The proportions should be such that the tungsten in the ore can be substantially reduced to a soluble form during roasting according to the above reactions (Equation I and II). A suitable proportion of the sodium carbonate or sodium phosphate, and sodium chloride for the process of this invention can be between about 6 percent and about 30 percent for the former and between about 6 percent and about 30 percent for the latter as based on the weight of the ore. The preferred proportion when using sodium carbonate in the roasting step should be between about 6 percent and about 12.5 percent sodium carbonate and between about 7 percent and about 12.5 percent sodium chlorode as based on the weight of the ore. It is within the scope of this invention that lower proportions of sodium carbonate and sodium chloride can be employed but lowered recovery of tungsten would result. When employing sodium phosphate as the reagent in the roasting step, the preferred proportion would be between about 10 percent and about 15 percent sodium phosphate and about 15 percent sodium chloride as based on the weight of the ore.

The roasting temperature of the ore, with the added reagents $Na_2CO_3$ or $Na_3PO_4$, and NaCl, is variable with a temperature about 600°C. and about 900°C. being suitable and a temperature between about 750°C. and about 850°C. being preferable. The roasting time should be between about 1 and about 3 hours since a roasting time in excess of 3 hours would not appreciably increase the yield of soluble tungsten values.

The water-leaching of the roasted ore can be carried out at a temperature of between about 50°C. and about 100°C. for a time period of no longer than about 4 hours and at least more than one-half hour. This will enable the substantially soluble form of the tungsten ($Na_2WO_4$) to be dissolved in the liquor. The mixture, so formed, can thereafter be filtered whereupon the tungsten values reporting in the filtrate can be recovered by conventional techniques such as solvent extraction and stripping.

In the preferred embodiment, sodium carbonate would be selected as one of the reagents rather than sodium phosphate because sodium carbonate is less expensive and is less of a pollutant than sodium phosphate. Thus the increased cost of sodium phosphate over sodium carbonate would render the former somewhat less desirable for large scale extraction of tungsten values from low grade tungsten ores. However, the benefit derived from the elimination of a pressure leach procedure as required in the prior art methods for extracting tungsten from low grade ores makes the use of either $Na_2CO_3$ or $Na_3PO_4$ admirably suited for such tungsten extraction.

EXAMPLE 1

Low grade tungsten ore obtained from Golconda, Nevada was chemically and spectrographically analyzed to determine the composition of the ore. The results of the analysis are shown in Table 1 and disclose that the percentage of tungsten trioxide ($WO_3$) in the ore was 1.12 percent. Thirteen test samples, each weighing 50 grams and sized 200 Tyler mesh and finer, were placed in separate 4 inch by 6 inch rectangular Inconel *

(*Trademark for alloy containing ≈ 76 percent Ni, 16 percent Cr and 6 percent Fe.) dishes along with various proportions of $Na_2CO_3$ and/or NaCl. Each sample was roasted in a muffle furnace for three hours at various temperatures. The calcines of each sample were then air cooled and water leached for 4 hours at the boiling point. The mixtures, so formed from each sample, were then filtered and water washed. The filtrate and residue from the filtration were analyzed from tungsten trioxide, the results of which are found in Table 2. In addition, Table 2 shows the proportions of $Na_2CO_3$ and/or NaCl added during the roast and the temperature at which the roast was performed. As demonstrated from the results of these tests, the amount of tungsten values extracted from the ore increased with the amount of NaCl added. The extraction of tungsten values from the ore using 10 percent NaCl and 10 percent $Na_2CO_3$ in the 800°C. roast (Test 6) was 88 percent. A favorable result was also obtained when 10 percent $Na_2CO_3$ and 30 percent NaCl was added to the roast (Test 2). The addition of only $Na_2CO_3$ in the 900°C. roast (Test 1), resulted in the ore fusing in the dish thereby preventing the extraction of the tungsten values. Several of the tests conducted with the addition of only $Na_2CO_3$ in various proportions in the ore roast at different temperatures yielded an extraction of tungsten values from a low of 15 percent (Test 5) to a high of 69 percent (Test 7). The increase in the extraction of tungsten values, under identical roasting conditions, using the combination of $Na_2CO_3$ and NaCl in the roast over the use of $Na_2CO_3$ alone, is demonstratively apparent from the test results. The best extraction of $WO_3$ from the ore as illustrated by the tests is an addition of 10 percent $Na_2CO_3$ and 10 percent NaCl to the ore prior to roasting at 800°C. Variation in the roasting temperature and the proportions of the reactants, $Na_2CO_3$ and NaCl, in the roast also gave good tungsten recovery from the ore as illustrated from the test results.

TABLE 1

| CHEMICAL ANALYSES | |
|---|---|
| Moisture | 3.41% |
| $WO_3$ | 1.12% (1.16% on oven dry basis) |
| SPECTROGRAPHIC ANALYSES | |
| Elements | Range in % |
| Al | 0.8–8 |
| As | 0.03–0.3 |
| B | 0.008–0.08 |
| Ba | 0.08–0.8 |
| Be | 0.0008–0.008 |
| Ca | Major |
| Cr | 0.002–0.02 |
| Cu | 0.0008–0.008 |
| Fe | Major |
| Ge | 0.008–0.08 |
| Mg | 0.04–4 |
| Mn | 0.8–8 |

TABLE 1-Continued

| CHEMICAL ANALYSES | |
|---|---|
| Na | 0.3–3 |
| Ni | 0.004–0.04 |
| Pb | 0.004–0.04 |
| Si | Major |
| Sr | 0.04–0.4 |
| Ti | 0.08–0.8 |
| V | 0.004–0.04 |
| W | 0.8–8 |
| Zr | 0.002–0.02 |

TABLE 2

| | Reagents Added | | | $WO_3$ Extraction After Filtration | |
|---|---|---|---|---|---|
| Test No. | Name | Amount g./100 g.Ore | Temp. of Roast °C. | % $WO_3$ Ext. | % $WO_3$ in Residue |
| 1 | $Na_2CO_3$ NaCl | 30 0 | 900 | Fused in Dish | |
| 2 | $Na_2CO_3$ NaCl | 10 30 | 900 | 84 | 0.17 |
| 3 | $Na_2CO_3$ NaCl | 10 20 | 900 | 78 | 0.23 |
| 4 | $Na_2CO_3$ NaCl | 10 10 | 900 | 74 | 0.27 |
| 5 | $Na_2CO_3$ NaCl | 10 0 | 900 | 15 | 1.07 |
| 6 | $Na_2CO_3$ NaCl | 10 10 | 800 (85–87) | 88 (0.17)* | 0.14 |
| 7 | $Na_2CO_3$ NaCl | 10 0 | 800 | 69 | 0.39 |
| 8 | $Na_2CO_3$ NaCl | 10 10 | 700 | 79 | 0.22 |
| 9 | $Na_2CO_3$ NaCl | 10 0 | 700 | 51 | 0.51 |
| 10 | $Na_2CO_3$ NaCl | 10 30 | 550 | 20 | 0.97 |
| 11 | $Na_2CO_3$ NaCl | 30 0 | 550 | 38 | 0.77 |
| 12 | $Na_2CO_3$ NaCl | 30 10 | 400 | 24 | 0.94 |
| 13 | $Na_2CO_3$ NaCl | 30 0 | 400 | 20 | 0.98 |

*(0.17%) by chemical analysis

EXAMPLE 2

Eighteen samples of low grade tungsten ore obtained from Golconda, Nevada were analyzed and found to contain 1.48 per cent tungsten trioxide ($WO_3$). Each sample, weighing 50 grams and sized 200 Tyler mesh and finer, was placed in separate 4 inch by 6 inch rectangular Inconel dishes along with various proportions of $Na_2CO_3$ and/or NaCl. Each sample was roasted in a muffle furnace for various time periods at various temperatures. The calcines of each sample were than air cooled and water leached for four hours at the boiling point. The mixtures so formed from each sample, were then filtered and water washed. The filtrate and residue from the filtration were analyzed for tungsten trioxide, the results of which are found in Table 3. In addition, Table 3 shows the proportions of $Na_2CO_3$ and/or NaCl added during the roast and the temperature at which the roast was performed. As demonstrated from the results of these tests, excellent tungsten recovery was had using $Na_2CO_3$ to NaCl ratios of 6.25/10 (Test 6) and 1/1 (Tests 11 through 14). The 1/1 ratio of $Na_2CO_3$ to NaCl appears to be effective only when NaCl is present in an amount greater than 7 percent as based on the weight of the ore.

TABLE 3

| Test No. | Reagents Added | | Temp. of Roast (hr.) | Roast Time (hr.) | WO₃ Extraction After Filtration | |
|---|---|---|---|---|---|---|
| | g./100 g.Ore Na₂CO₃ | g./100 g.Ore NaCl | | | % WO₃ Ext. | % WO₃ in Residue |
| 1 | 3.00 | 10.0 | 800 | 3 | 20.3 | 1.27 |
| 2 | 3.75 | 7.5 | 800 | 3 | 31.6 | 0.94 |
| 3 | 3.75 | 10.0 | 800 | 3 | 35.8 | 0.78 |
| 4 | 5.00 | 5.00 | 800 | 3 | 30.8 | 0.77 |
| 5 | 5.00 | 7.5 | 800 | 3 | 66.2 | 0.50 |
| 6 | 6.25 | 10.0 | 800 | 3 | 87.4 | 0.20 |
| 7 | 7.5 | 7.5 | 800 | 3 | 78.8 | 0.31 |
| 8 | 5.00 | 0.0 | 800 | 3 | 2.7 | 1.18 |
| 9 | 0.0 | 5.0 | 800 | 3 | 1.6 | 1.09 |
| 10 | 12.5 | 12.5 | 800 | 3 | 89.3 | 0.16 |
| 11 | 10.0 | 10.0 | 850 | 3 | 85.0 | 0.20 |
| 12 | 10.0 | 10.0 | 750 | 3 | 86.4 | 0.21 |
| 13 | 10.0 | 10.0 | 800 | 5 | 86.0 | 0.20 |
| 14 | 7.5 | 7.5 | 800 | 1 | 75.0 | 0.41 |
| 15 | 6.0 | 6.0 | 800 | 3 | 58.2 | 0.63 |
| 16 | 6.0 | 12.0 | 800 | 3 | 78.6 | 0.32 |
| 17 | 6.0 | 12.0 | 900 | 3 | 65.0 | 0.47 |
| 18 | 3.0 | 8.0 | 800 | 3 | 18.9 | 1.43 |

EXAMPLE 3

Six test samples of the 1.12 percent WO₃ ore of Example 1, each weighing 50 grams and sized 200 Tyler mesh and finer, were placed in separate 4 inch by 6 inch rectangular Inconel dishes along with various proportions of $Na_3PO_4$ and/or NaCl. Each sample was roasted in a muffle furnace for 3 hours at 900°C. The calcines of each sample were then air cooled and water leached for 4 hours at the boiling point. The mixtures, so formed from each sample, were then filtered and water washed. The filtrate and residue from the filtration were analyzed for tungsten trioxide, the results of which are found in Table 4. In addition, Table 4 shows the proportions of $Na_3PO_4$ and/or NaCl added during the roast. As demonstrated from the results of these tests, excellent tungsten recovery was had using $Na_3PO_4$ to NaCl ratios of 10/15 (Test 3) and 1/1 (Test 4).

As shown in Table 4, an extraction of 92 percent WO₃ was obtained using an addition to the ore prior to roasting of 15 percent $Na_3PO_4$ and 15 percent NaCl as based on the weight of the ore.

TABLE 4

| Test No. | Reagents Added | | WO₃ Extraction After Filtration | |
|---|---|---|---|---|
| | Name | g./100 g. Ore | % WO₃ Ext. | % WO₃ in Residue |
| 1 | Na₃PO₄ | 2.5 | 53 | 0.52 |
| | NaCl | 15 | | |
| 2 | Na₃PO₄ | 5 | 61 | 0.35 |
| | NaCl | 15 | | |
| 3 | Na₃PO₄ | 10 | 79 | 0.18 |
| | NaCl | 15 | | |
| 4 | Na₃PO₄ | 15 | 92 | 0.11 |
| | NaCl | 15 | | |
| 5 | NaCl | 30 | 23 | 1.03 |
| 6 | NaCl | 50 | 21 | 1.05 |

What is claimed is:

1. A process for extracting tungsten values from a low grade tungsten ore comprising the steps:
   a. roasting a particulated tungsten-containing ore in a water containing atmosphere in the presence of NaCl and at least one of the reagents selected from the group consisting of $Na_2CO_3$ and $Na_3PO_4$, at a temperature in the range of about 600°C to about 900°C for about 1 to 3 hours, the amount of NaCl being from about 6 to 30 percent of the weight of the ore, and the aggregate amount of selected reagents being from about 6 to 30 percent of the weight of the ore and also being in a weight ratio to the amount of NaCl of from about 1/1 to 1/3;
   b. water leaching the resulting calcines of the roasted ore at a temperature in the range of about 50°C to 100°C for from about one-half hour to 4 hours to substantially dissolve the soluble tungsten values of said calcines in the leach liquor; and
   c. filtering the leach liquor during which the tungsten values substantially report to the filtrate where they can then be extracted.

2. The process of claim 1 wherein the particulated ore is substantially sized between about 50 Tyler mesh and about 325 Tyler mesh.

3. The process of claim 1 wherein the step a. the selected reagent is $Na_2CO_3$ and is present in an amount between about 6 percent and about 12.5 percent; said NaCl is present in an amount between about 7 percent and about 12.5 percent and said temperature of the roast is between about 750°C. and 850°C.

4. The process of claim 1 wherein in step a. the selected reagent is $Na_3PO_4$ and is present in an amount between about 10 percent and about 15 percent; said NaCl is present in an amount about 15 percent and said temperature is present between about 750°C. and about 900°C.

* * * * *

UNITED STATES PATENT OFFICE
CERTIFICATE OF CORRECTION

Patent No. 3,800,025          Issue Date March 26, 1974

Inventor(s) Joseph S. Fox

It is certified that error appears in the above-identified patent and that said Letters Patent are hereby corrected as shown below:

In column 2 at lines 1, 2 and 7 after "$WO_3$"

insert -- $\longrightarrow$ --.

In column 2 at line 5 after "(i.e. $CaWO_4$)"

insert -- $\longrightarrow$ --.

Signed and sealed this 10th day of September 1974.

(SEAL)
Attest:

McCOY M. GIBSON, JR.
Attesting Officer

C. MARSHALL DANN
Commissioner of Patents